United States Patent
Blowytsky (10) Patent No.: US 10,279,651 B2
(45) Date of Patent: May 7, 2019

(54) HEATING, VENTILATION, AND AIR CONDITIONING UNIT

(71) Applicant: DENSO International America, Inc., Southfield, MI (US)

(72) Inventor: Alexander Blowytsky, Royal Oak, MI (US)

(73) Assignee: DENSO International America Inc., Southfield, MI (US)

( * ) Notice: Subject to any disclaimer, the term of this patent is extended or adjusted under 35 U.S.C. 154(b) by 590 days.

(21) Appl. No.: 15/003,997

(22) Filed: Jan. 22, 2016

(65) Prior Publication Data

US 2017/0210200 A1 Jul. 27, 2017

(51) Int. Cl.
*B60S 1/54* (2006.01)
*B60H 1/00* (2006.01)

(52) U.S. Cl.
CPC ..... *B60H 1/00678* (2013.01); *B60H 1/00564* (2013.01); *B60H 2001/00092* (2013.01); *B60H 2001/00707* (2013.01); *B60H 2001/00714* (2013.01); *B60H 2001/00721* (2013.01)

(58) Field of Classification Search
CPC .................. B60H 1/00678; B60H 1/00564
USPC ........................................ 454/127; 137/385
See application file for complete search history.

(56) References Cited

U.S. PATENT DOCUMENTS 4,498,528 A * 2/1985 Jacquet .............. B60H 1/00678
137/625.44

* cited by examiner

*Primary Examiner* — Vivek K Shirsat (57) ABSTRACT

A heating, ventilation, and air conditioning unit includes a case, a door, an actuator, and a holding member. The case has a first wall, a second wall, and a third wall. The first wall and the second wall are connected by the third wall to face each other. The door is rotatably disposed inside the case through a rotational axis. The door rotates about the rotational axis to selectively open and close an air outlet. The actuator rotates the door between a closed position where the door closes the air outlet and an open position where the door opens the air outlet. The holding member is disposed in the second wall and holds the door when the door rotates to the open position by engaging the door.

10 Claims, 6 Drawing Sheets

FIG. 7
COMPARATIVE EXAMPLE

HEATING, VENTILATION, AND AIR CONDITIONING UNIT

FIELD

The present disclosure relates to a heating, ventilation, and air conditioning (HVAC) unit.

BACKGROUND

This section provides background information related to the present disclosure which is not necessarily prior art.

Vehicles are known to incorporate HVAC systems to improve the comfort of the people within the passenger compartment of the vehicle. The HVAC systems heat and cool air blown through a HVAC unit using a heating heat exchanger and/or a cooling heat exchanger. The HVAC unit is typically designed to provide a defrost mode where air is directed to the front windshield through a defrost outlet, a face mode where air is directed through a face outlet in the instrument panel toward the upper portion of the body of the passengers and a floor mode where air is directed toward a floor outlet that directs air towards the feet of the passengers.

Such a HVAC unit includes doors for the defrost outlet, the face outlet and the floor outlet. Each door is rotatably disposed inside a case of the HVAC unit and is configured to selectively open and close the corresponding inlet. The HVAC unit also includes an actuator that rotates the doors. For example, when the HVAC unit is in the defrost mode, the actuator rotates the door to a specified position to open the defrost outlet, and thus air is allowed to flow through the defrost outlet toward the front windshield.

SUMMARY

This section provides a general summary of the disclosure, and is not a comprehensive disclosure of its full scope or all of its features.

The present disclosure provides a heating, ventilation, and air conditioning unit including: a case that has a first wall, a second wall, and a third wall, the first wall and the second wall being connected by the third wall to face each other; a door that is rotatably disposed inside the case through a rotational axis extending between the first wall and the second wall, the door rotating about the rotational axis to selectively open and close an air outlet defined in the third wall; an actuator that is attached to the first wall and that rotates the door between a closed position where the door closes the air outlet to prohibit air from flowing out of the case through the air outlet and an open position where the door opens the air outlet to allow air to flow out of the case through the air outlet; and a holding member that is disposed in the second wall and that holds the door when the door rotates to the open position by engaging the door.

The holding member holds the door when the door is in the open position, and thus, the door is maintained at the open position even when the door receives air flowing toward the outlet. Accordingly, a suitable amount of air is provided through the outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

First Embodiment

Figure 1:
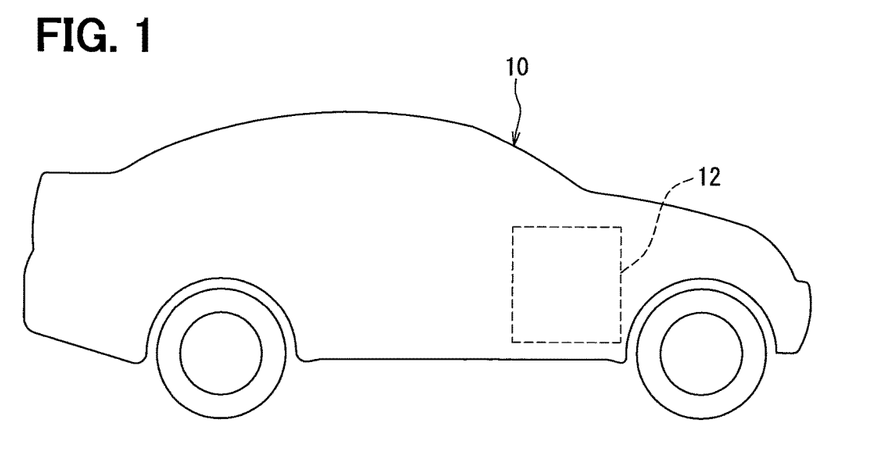
FIG. 1 is a side view of a vehicle with a HVAC unit in accordance with the present disclosure schematically illustrated therein.

With reference to FIG. 1, a vehicle 10 incorporating a HVAC unit 12 in accordance with the present disclosure is illustrated. The HVAC unit 12 is typically disposed within a dashboard of the vehicle 10 and either cools or warms air flowing through the HVAC unit 12. In order to cool the air, the HVAC unit 12 houses an evaporator 13 in a case 14 which is part of an air conditioning system of the vehicle 10. In order to heat the air, the HVAC unit 12 houses a heating heat exchanger 16 in the air case 14 which typically receives engine coolant from an engine cooling system (not shown) of the vehicle 10.

Figure 2:
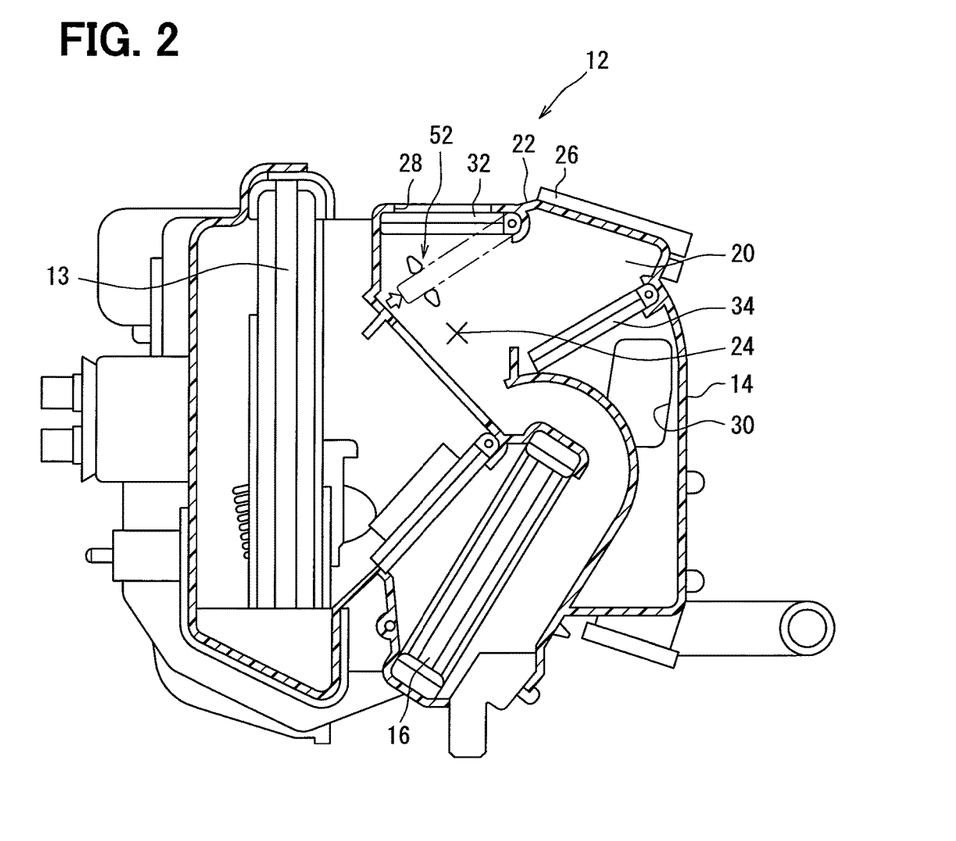
FIG. 2 is a sectional view of a case of the HVAC unit illustrated in FIG. 1.

The HVAC unit 12 includes the case 14 having a conventional fan (not shown) which is arranged on an upstream side of the evaporator 13. The case 14 includes at least a first wall 18, a second wall 20, and a third wall 22, and a flow passage 24 as an airflow path is defined within the case 14. The first wall 18 and the second wall 20 face each other with a given distance therebetween, and the third wall 22 connects the first wall 18 and the second wall 20. In the present embodiment, both the first wall 18 and the second wall 20 serve as side walls of the case 14 and the third wall 22 serves as a top wall of the case 14.

The case 14 accommodates the evaporator 13 and, on the downstream side of the evaporator 13, the heating heat exchanger 16. The third wall 22 defines a face outlet 26 and a defrost outlet 28 and the second wall 20 defines a foot outlet 30.

The case 14 further houses a defrost door (door) 32 provided for the defrost outlet 28 and a face/foot door 34 provided for the face outlet 26 and the foot outlet 30. The defrost door 32 is rotatably disposed in the case 14 through an axial shaft 32a, and the axial shaft 32a extends between the first and second walls 18, 20. In the present embodiment, the axial shaft 32a also extends through the first wall 18 to outside of the first wall 18. As will be described below, a flange portion 32b is formed on the axial shaft 32a at a position outside of the first wall 18.

The HVAC unit 12 includes a servo motor (actuator) 36 attached to the first wall 18 on an outside of the case 14. The servo motor 36 has a driving shaft (not shown) that is connected to the axial shaft 32a of the defrost door 32. The servo motor 36 is electrically connected to an air conditioning controller (not shown) and the air conditioning controller controls operation of the servo motor 36. More specifically, the air conditioning controller controls the servo motor 36 to rotate the defrost door 32 between a closed position and an open position (refer to FIG. 4).

Figure 4:
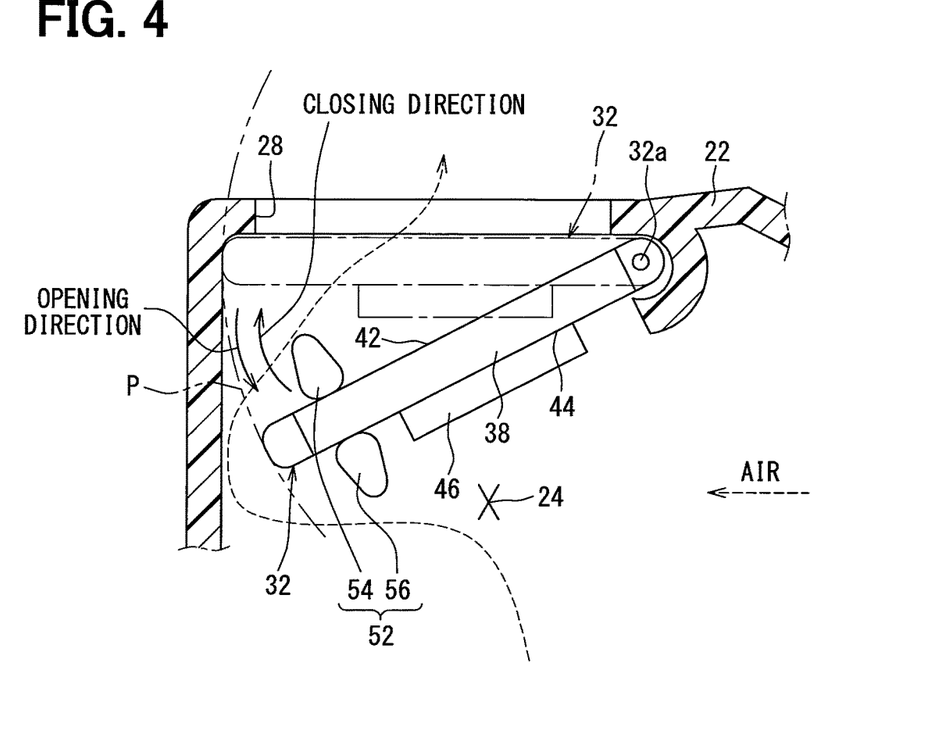
FIG. 4 is an enlarged view of the defrost door illustrated in FIG. 2.

In a non-defrost mode, the servo motor 36 rotates the defrost door 32 to the closed position where the defrost door 32 closes the defrost outlet 28 (see the one-dashed line of the defrost door 32 in FIG. 4). Thus, air flowing through the flow passage 24 is prohibited from flowing through the defrost outlet 28. In a defrost mode, the servo motor 36 rotates the defrost door 32 to the open position where the defrost door 32 opens the defrost outlet 28, whereby air flowing through the flow passage 24 is allowed to flow out of the case 14 through the defrost outlet 28 toward the front windshield (see the solid line of the defrost door 32 in FIG. 4).

The defrost door 32 is formed in a rectangular plate shape. In the present embodiment, the width of the defrost door 32 along the axial shaft 32a is set to be shorter than the distance between the first wall 18 and the second wall 20. The defrost door 32 has a first side surface 38 facing the first wall 18 and a second side surface 40 (side surface) facing the second wall 20. Further, the defrost door 32 has a first surface 42 and a second surface 44 opposite to the first surface 42. As shown in FIG. 4, the first surface 42 faces toward the defrost outlet 28. In contrast, the second surface 44 faces away from the defrost outlet 28. Hereinafter, one rotational direction of the defrost door 32 from the closed position to the open position is referred to as an opening direction and the other rotational direction of the defrost door 32 from the open position to the closed position is referred to as a closing direction.

Figure 3:
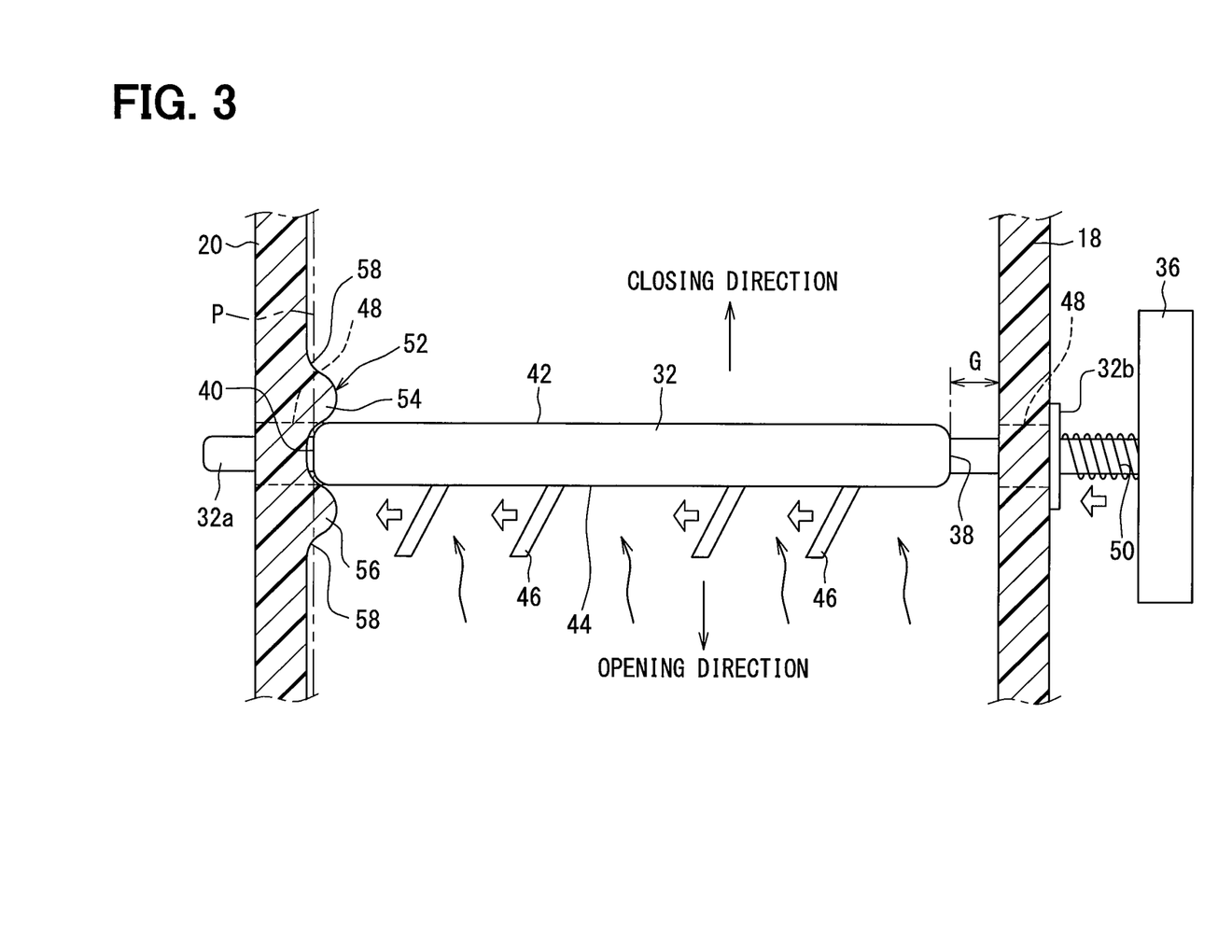
FIG. 3 is a diagram of a defrost door viewed from the arrow indicated in FIG. 2.

The defrost door 32 includes a plurality of louvers (biasing members) 46 on the second surface 44. In the present embodiment, four louvers 46 are arranged along the axial direction. As shown in FIG. 3, each louver 46 is angled relative to the axial direction at the substantially same angle, i.e., the louvers 46 are inclined to be parallel to each other. More specifically, each louver 46 is inclined toward the second wall 20 from the second surface 44, and thus the tip of each louver 46 (i.e., the one end of the louver 46 distal to the second surface 44) is closer to the second wall 20 than the base of each louver 46 (i.e., the other end of the louver 46 proximate to the second surface 44) is to the second wall 20.

A respective supporting member 48 is disposed in each of the first and second walls 18, 20. The axial shaft 32a has two ends slidably and rotatably supported by the supporting members 48. Thus, the defrost door 32 is configured to be movable along its extending direction (i.e., the axial direction) and rotatable about the axial shaft 32a.

Figure 5:
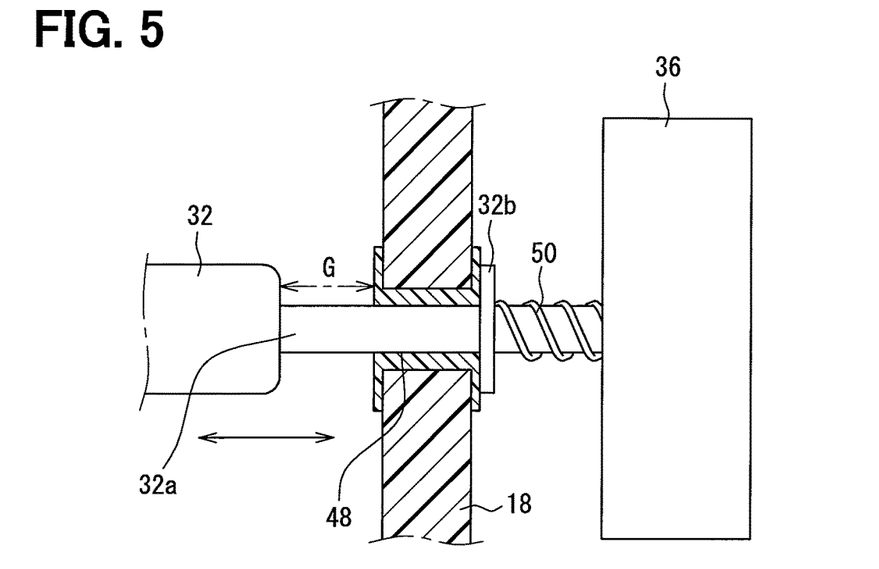
FIG. 5 is an enlarged view of a portion of the defrost door illustrated in FIG. 3.

In the present embodiment, an elastic spring 50 (biasing member) is disposed between the first wall 18 and the servo motor 36. More specifically, the elastic spring 50 is disposed between the flange portion 32b and the servo motor 36. As shown in FIG. 5, the flange portion 32b extends radially outwardly from the axial shaft 32a. One end portion of the elastic spring 50 is attached to the flange portion 32b and the other end portion of the elastic spring 50 is attached to the servo motor 36. The elastic spring 50 has a relaxed length along the axial direction longer than a space between the flange portion 32b and the servo motor 36. Thus, the elastic spring 50 is set between the flange portion 32b and the servo motor 36 in a compressed state. Hence, the elastic spring 50 biases the flange portion 32b toward the first wall 18 (and the second wall 20) by an elastic force (biasing force). Thus, the defrost door 32 is biased toward the second wall 20 (the left side in FIG. 3).

Due to the elastic force of the elastic spring 50, the flange portion 32b generally contacts the first wall 18. When the flange portion 32b is in this position, the defrost door 32 is at a position adjacent to the second wall 20. Thus, the defrost door 32 is generally maintained at the position adjacent to the second wall 20, as shown in FIG. 3. When the defrost door 32 is at the position adjacent to the second wall 20 due to the elastic force of the elastic spring 50, a gap G is formed between the defrost door 32 (the first side surface 38) and the first wall 18 (see FIG. 3). In other words, the defrost door 32 is allowed to move in the axial direction by, at most, the length of the gap G.

The HVAC unit 12 further includes a holding member 52. The holding member 52 is formed on the second wall 20 at a position corresponding to the open position of the defrost door 32. The position of the holding member 52 may be determined through prior experimentation. The holding member 52 is configured to engage the defrost door 32 when the defrost door 32 rotates to the open position. By engaging the defrost door 32, the holding member 52 holds the defrost door 32 at the open position. As shown in FIG. 3, the holding member 52 includes a first protruding portion 54 and a second protruding portion 56. In the present embodiment, both the first protruding portion 54 and the second protruding portion 56 are integrally formed with the second wall 20 by, e.g., molding.

The first protruding portion 54 and the second protruding portion 56 are spaced away from each other. The distance between the first protruding portion 54 and the second protruding portion 56 is set so as to interpose the second side surface 40 of the defrost door 32 therebetween. As shown in FIG. 4, the first protruding portion 54 is closer to the defrost outlet 28 than the second protruding portion 56 is. In other words, when the defrost door 32 is at the open position, the first protruding portion 54 is on a closing direction side of the defrost door 32, whereas the second protruding portion 56 is on an opening direction side of the defrost door 32.

The first protruding portion 54 and the second protruding portion 56 protrude from the second wall 20 toward the first wall 18. As shown in FIG. 3, the first protruding portion 54 has an apex and a slope 58 (slope portion). The slope 58 is formed on a side of the first protruding portion 54 opposite to the second protruding portion 56. The slope 58 is gradually sloped from the second wall 20 toward the apex of the first protruding portion 54. Similarly, the second protruding portion 56 has an apex and a slope 58. The slope 58 of the second protruding portion 56 is on a side of the second protruding portion 56 opposite to the first protruding portion 54 and is gradually sloped from the second wall 20 toward the apex of the second protruding portion 56. Each slope 58 forms a smooth surface that serves as a guiding surface for guiding the defrost door 32 from the second wall 20 to the apex of each protruding portion 54, 56.

As shown in FIG. 3, the apexes of the first and second protruding portions 54, 56 are positioned closer to the first wall 18 than the second side surface 40 is when the defrost door 32 is at the open position. In other words, when the defrost door 32 is at the position adjacent to the second wall 20 by the elastic force of the elastic spring 50, the second side surface 40 is closer to the second wall 20 than the apexes of the first and second protruding portions 54, 56 are.

More specifically, an imaginary plane P is defined as a plane along which the second side surface 40 of the defrost door 32 moves when the defrost door 32 rotates from the closed position to the open position, as shown in FIGS. 3 and 4. The first protruding portion 54 and the second protruding portion 56 protrude from the second wall 20 to enter into the imaginary plane P. In other words, the apexes of the first protruding portion 54 and the second protruding portion 56 are positioned closer to the first wall 18 than the imaginary plane P is.

Figure 6:
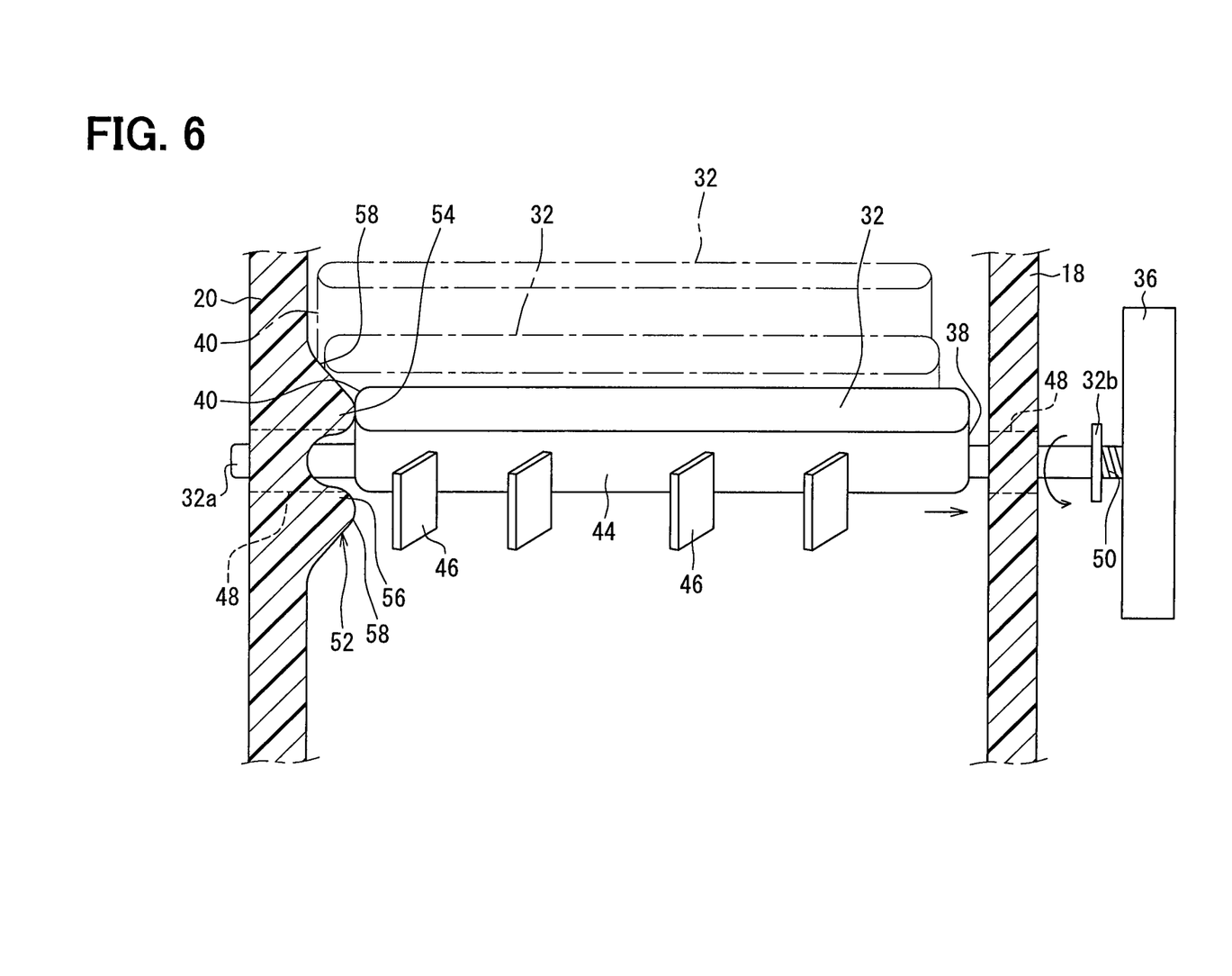
FIG. 6 is a diagram of the defrost door when moving over a first protruding portion.

As shown in FIG. 6, when the defrost door 32 rotates in the opening direction from the closed position, the second side surface 40 of the defrost door 32 contacts the first protruding portion 54. More specifically, the second side surface 40 of the defrost door 32 contacts the slope 58 of the first protruding portion 54. Then, the second side surface 40 is guided along the slope 58 of the first protruding portion 54. As a result, the defrost door 32 is moved toward the first wall 18 against the elastic force by the elastic spring 50. As described above, since the gap G is formed between the defrost door 32 and the first wall 18, the defrost door 32 is allowed to move toward the first wall 18.

Next, the defrost door 32 continues to rotate toward the open position, and when the defrost door 32 moves over the apex of the first protruding portion 54, the defrost door 32 is moved back toward the second wall 20 by the elastic force by the elastic spring 50 (see FIG. 3). As a result, the second side surface 40 of the defrost door 32 is interposed and held between the first protruding portion 54 and the second protruding portion 56. More specifically, when the defrost door 32 is at the open position, the first protruding portion 54 contacts the first surface 42 of the defrost door 32 and the second protruding portion 56 contacts the second surface 44 of the defrost door 32. In other words, the second side surface 40 of the defrost door 32 is engaged by the holding member 52.

To clarify the technical significance of the present disclosure, a comparative example of a HVAC unit 100 will be described with reference to FIG. 7. The HVAC unit 100 of the comparative example does not have the holding member 52 and the defrost door 132 is maintained at the open position by a holding force of the servo motor. When the defrost door 132 is at the open position, the defrost door 132 receives air flowing through the flow passage 124. Accordingly, the defrost door 132 receives a pressure from the air in the closing direction.

Figure 7:
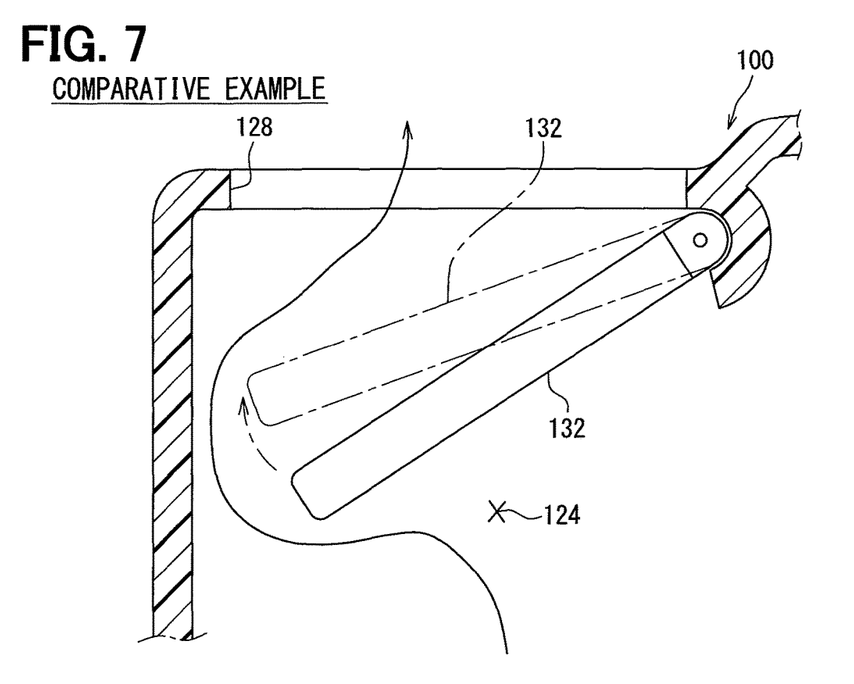
FIG. 7 is an enlarged view of a HVAC unit in accordance with a comparative example.

If the pressure from the air is greater than the holding force of the servo motor, the defrost door 132 of the comparative example may rotate in the closing direction by a given angle (see the one-dashed line of the defrost door 132 in FIG. 7). As a result, an airflow toward the defrost outlet 128 is affected by the defrost door 132 of the comparative example, thereby causing a decrease in defrost air distribution.

In contrast, the defrost door 32 according to the present embodiment is held by the holding member 52 at the open position in addition to a holding force by the servo motor 36. Thus, the defrost door 32 is maintained at the open position even when the defrost door 32 receives a pressure from air flowing through the flow passage 24. In addition, since the defrost door 32 is biased toward the second wall 20 by the elastic force of the elastic spring 50, the defrost door 32 may be suppressed from moving over the holding member 52 (more specifically, the first protruding portion 54) due to air pressure alone.

Furthermore, when the defrost door 32 is at the open position, the louvers 46 receive air flowing through the flow passage 24. As described above, the louvers 46 are inclined toward the second wall 20 from the second surface 44 of the defrost door 32, whereby each louver 46 receives a biasing force toward the second wall 20 from the air. That is, the defrost door 32 is biased toward the second wall 20 from the air in addition to the elastic force of the elastic spring 50. Hence, the defrost door 32 may be further suppressed from moving over the first protruding portion 54 when the defrost door 32 is at the open position.

In the present embodiment, the second protruding portion 56 is disposed on the opening direction side of the defrost door 32. Thus, even if the defrost door 32 is biased in the opening direction, the second protruding portion 56 may inhibit the defrost door 32 from rotating in the opening direction. In other words, the defrost door 32 is maintained at the open position by two protruding portions 54, 56, whereby a suitable amount of air may be provided through the defrost outlet 28.

In the non-defrost mode, the servo motor 36 is controlled to rotate the defrost door 32 in the closing direction. Due to the driving force of the servo motor 36, the defrost door 32 moves in the closing direction over the first protruding portion 54. When moving over the first protruding portion 54, the defrost door 32 contacts the first protruding portion 54 and as a result is moved toward the first wall 18 against the elastic force of the elastic spring 50. In other words, the servo motor 36 drives the defrost door 32 with a driving force sufficient to overcome the holding force of the first and second protruding portions 54, 64. When the defrost door 32 reaches the closed position, the defrost door 32 closes the defrost outlet 28 to prohibit air from flowing out of the case 14 (see the one-dashed line of the defrost door 32 in FIG. 4).

Second Embodiment

Figure 8:
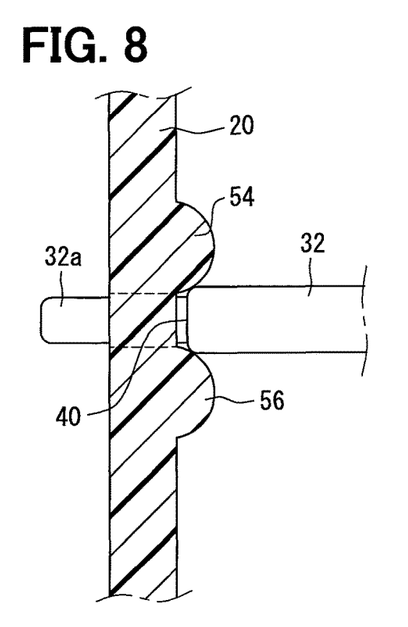
FIG. 8 is a diagram of a holding member in accordance with a second embodiment.

In the first embodiment, the first protruding portion 54 and the second protruding portion 56 have the slope 58. However, the holding member 52 is not necessarily limited to this configuration. As shown in FIG. 8, the first protruding portion 54 and the second protruding portion 56 may be formed without the slopes 58. For example, the first protruding portion 54 and the second protruding portion 56 may be formed into a bump form.

Third Embodiment

Figure 9:
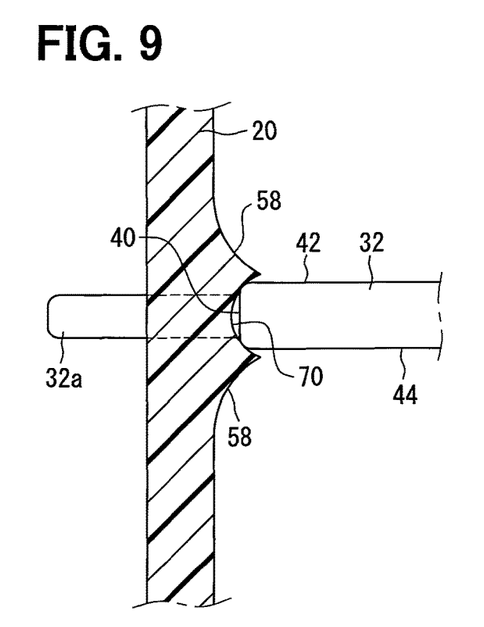
FIG. 9 is a diagram of a holding member in accordance with a third embodiment.

FIG. 9 shows the holding member 52 according to the third embodiment. The holding member 52 is formed of two slopes and a recessed portion 70. The recessed portion 70 is configured to hold the second side surface 40 of the defrost door 32 when the defrost door 32 rotates to the open position.

Fourth Embodiment

Figure 10:
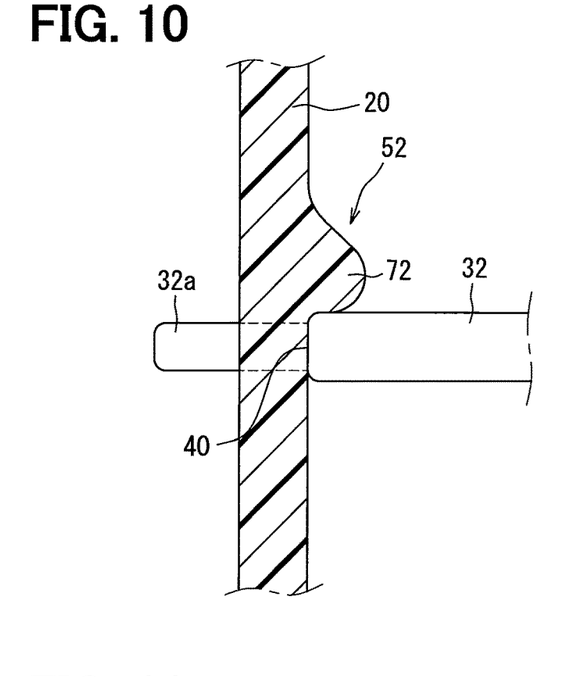
FIG. 10 is a diagram of a holding member in accordance with a fourth embodiment.

In the above-described embodiments, the holding member 52 includes the first protruding portion 54 and the second protruding portion 56 and is configured to hold the defrost door 32 between the first and the second protruding portions 54, 56. However, the holding member 52 is not necessarily limited to have two such protruding portions. FIG. 10 shows the holding member 52 according to the fourth embodiment. The holding member 52 has only one protruding portion (single protruding portion) 72. The single protruding portion 72 is disposed on the second wall 20 and is positioned on the closing direction side of the defrost door 32 when the defrost door 32 is at the open position.

As with the first protruding portion 54 of the first embodiment, the single protruding portion 72 holds (engages) the second side surface 40 of the defrost door 32 at the open position. Accordingly, the defrost door 32 is inhibited from rotating in the closing direction by the single protruding portion 72 when the defrost door 32 is at the open position. Thus, even when the defrost door 32 receives air flowing through the flow passage 24 and is biased in the closing direction by the air, the defrost door 32 can be maintained at the open position.

Other Embodiments

In the above-described embodiments, the holding member 52 is used to hold the defrost door 32. However, the holding member 52 can be provided to hold another door, such as the face/foot door 34 or a heater door (not shown), at an open position.

In the above-described embodiment, the holding member 52 is formed with the second wall 20 by molding. However, the holding member 52 may be formed by punching the second wall 20 from an outside of the case 14 to form the first protruding portion 54 and the second protruding portion 56.

Figure 11:
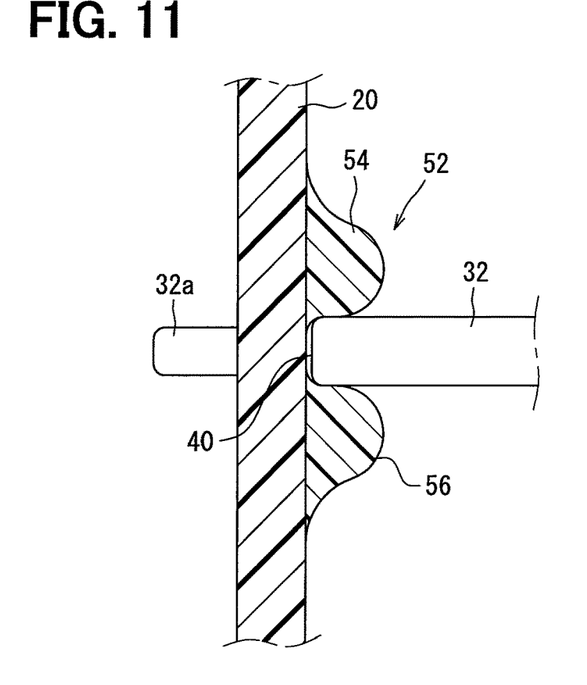
FIG. 11 is a diagram of a holding member in accordance with another embodiment.

Furthermore, the holding member 52 may be separately formed on the second wall 20. For example, the first protruding portion 54 and the second protruding portion 56 may be separately formed with the second wall 20 as shown in FIG. 11. Then, the first and second protruding portions 54, 56 may be attached on the second wall 20 by, e.g., screws, or may be glued on the second wall 20. Alternatively, the separately formed protruding portions may be disposed in the second wall 20 by being inserted through the second wall 20.

In the above-described embodiments, both the elastic spring 50 and the louvers 46 are provided as the biasing members. However, either the elastic spring 50 or the louvers 46 may be disposed as the biasing member without including the other.

In the above-described embodiments, the drive shaft of the servo motor 36 is connected to the axial shaft 32a of the defrost door 32 and directly rotates the defrost door 32. However, the servo motor 36 may be connected to the defrost door 32 through a linkage mechanism and may indirectly rotate the defrost door 32.

The louvers 46 and/or the elastic spring 50 may be optional and may be omitted. The biasing member may be other than the louvers 46 and/or the elastic spring 50. For example, the first wall 18 may support the defrost door 32 such that the first wall 18 regulates movement of the defrost door 32 in the axial direction of the axial shaft 32a. In this configuration, the defrost door 32 may be biased toward the second wall 20 by utilizing resiliency of the first wall 18 as the biasing member.

In the above-described embodiments, the holding member 52 is configured to engage with the defrost door 32. Therefore, even when the blower operates at a maximum load to blow a large quantity of air, the engagement between the holding member 52 and the defrost door 32 may restrict the defrost door 32 from moving from the predetermined open position.

What is claimed is:

1. A heating, ventilation, and air conditioning unit comprising:
    a case that has a first wall, a second wall, and a third wall, the first wall and the second wall being connected by the third wall to face each other;
    a door that is rotatably disposed inside the case through a rotational axis extending between the first wall and the second wall, the door rotating about the rotational axis to selectively open and close an air outlet defined in the third wall;
    an actuator that is attached to the first wall and that rotates the door between a closed position where the door closes the air outlet to prohibit air from flowing out of the case through the air outlet and an open position where the door opens the air outlet to allow air to flow out of the case through the air outlet;
    a holding member that is disposed in the second wall and that holds the door when the door rotates to the open position by engaging the door, wherein
    the door includes a side surface facing the second wall,
    the holding member protrudes from the second wall toward the first wall,
    the holding member includes an apex that is positioned closer to the first wall than the side surface when the door is at the open position,
    the door includes a first surface that faces toward the air outlet,
    the holding member includes a first protruding portion that, when the door is at the open position, contacts the first surface to inhibit the door from rotating toward the air outlet,
    the door includes a second surface that faces away from the air outlet, and
    the holding member includes a second protruding portion that, when the door is at the open position, contacts the second surface to inhibit the door from rotating away from the air outlet; and
    a biasing member that biases the door toward the second wall by a biasing force, wherein
    a width of the door along the rotational axis is shorter than a distance between the first wall and the second wall along the rotational axis,
    the door is configured to be movable along the rotational axis,
    the door is maintained to be adjacent the second wall by the biasing force of the biasing member, when the door is at the open position, such that the side surface is closer to the second wall than the apex of the holding member is to the second wall, and
    when the actuator rotates the door between the closed position and the open position, the side surface moves over the holding member while moving toward the first wall along the rotational axis against the biasing force of the biasing member.

2. The heating, ventilation, and air conditioning unit according to claim 1, wherein
the holding member includes a slope portion that is gradually sloped from the second wall toward the apex of the holding member.

3. The heating, ventilation, and air conditioning unit according to claim 1, wherein
the first protruding portion and the second protruding portion are spaced away from each other, and
the side surface of the door is held between the first protruding portion and the second protruding portion when the door is at the open position.

4. The heating, ventilation, and air conditioning unit according to claim 1, wherein
the biasing member is an elastic spring that generates the biasing force.

5. The heating, ventilation, and air conditioning unit according to claim 1, wherein
the door includes a surface that faces away from the air outlet,
the biasing member includes a louver that is disposed on the surface of the door, and
the louver is configured to be inclined toward the second wall from the surface of the door to generate the biasing force when the louver receives air flowing toward the air outlet.

6. The heating, ventilation, and air conditioning unit according to claim 1, wherein
the holding member is integrally formed on the second wall.

7. The heating, ventilation, and air conditioning unit according to claim 6, wherein
the holding member is molded with the second wall.

8. The heating, ventilation, and air conditioning unit according to claim 6, wherein
the holding member is formed by punching the second wall.

9. The heating, ventilation, and air conditioning unit according to claim 1, wherein
the holding member is separately formed with the second wall.

10. The heating, ventilation, and air conditioning unit according to claim 9, wherein
the holding member is glued on the second wall.

* * * * *